United States Patent [19]

Kleimann et al.

[11] 3,925,527
[45] Dec. 9, 1975

[54] METHOD OF MAKING FOAMED URETHANE RESINS HAVING IMPROVED MOLD RELEASE PROPERTIES

[75] Inventors: Helmut Kleimann; Wulf von Bonin, both of Leverkusen; Heinz-Georg Schneider, Gummersbach; Herbert Gebauer, Krefeld, all of Germany

[73] Assignee: Bayer Aktiengesellschaft, Leverkusen Bayerwerk, Germany

[22] Filed: Jan. 30, 1974

[21] Appl. No.: 438,111

[30] Foreign Application Priority Data
Apr. 18, 1973 Germany.......................... 2319648

[52] U.S. Cl. ...... 264/53; 260/2.5 AG; 260/2.5 AM; 260/2.5 AN; 260/2.5 AT; 260/2.5 AZ; 264/48; 264/54; 264/338
[51] Int. Cl.² .................. C08G 18/14; G08G 18/36; C08K 5/16

[58] Field of Search... 260/2.5 AT, 2.5 AZ, 2.5 AN, 260/2.5 AM, 2.5 AG; 264/48, 53, 54

[56] References Cited
UNITED STATES PATENTS

| | | | |
|---|---|---|---|
| 3,037,947 | 6/1962 | Elkin | 260/2.5 AM |
| 3,595,814 | 7/1971 | Lloyd | 264/48 |
| 3,726,952 | 4/1973 | Boden | 260/2.5 AZ |

*Primary Examiner*—Donald E. Czaja
*Assistant Examiner*—C. Warren Ivy
*Attorney, Agent, or Firm*—Joseph C. Gil

[57] ABSTRACT

A reaction product of a fatty acid ester and an organic monoisocyanate is included in a foamable reaction mixture containing an organic polyisocyanate to provide a molded product which can be removed from a mold whose surface has not been coated with conventional mold release agents.

14 Claims, No Drawings

METHOD OF MAKING FOAMED URETHANE RESINS HAVING IMPROVED MOLD RELEASE PROPERTIES

This invention relates generally to a process for making molded foam resins and more particularly to a method for the production of molded foam resins which have excellent properties which insure their easy release from the mold.

Foam resins based on organic polyisocyanates such as polyurethane foams which have a dense outer skin and a cellular core prepared by foaming a foamable reaction mixture in a mold (German Auslegeschrift No. 1,196,864 and French Patent Specification No. 1,559,325) are eminently suitable for mass production of lightweight building elements e.g. for the manufacture of furniture and vehicles and for house building.

The molded polyurethane products are produced by introducing a foamable reaction mixture containing a polyisocyanate, a compound which contains at least two hydrogen atoms capable of reacting with isocyanates and additives into a closed, heatable mold in which the mixture foams up and solidifies in a highly compressed state.

The resin completely fills the mold and accurately reproduces the internal surfaces of the mold.

The molds are preferably made of a material having a high thermal capacity and high thermal conductivity, preferably a metal, although other materials such as plastics, glass, wood and the like may also be used.

The mold is covered with a mold release agent to prevent the resin from sticking to the surface of the mold when it is removed. The commonly used mold release agents include waxes, soaps or oils. These form a thin film between the surface of the mold and the resin which does not stick either to the mold or to the resin, so that the resin can easily be removed from the mold.

This method has various disadvantages for mass production. Firstly, the mold release agent must be applied at regular intervals. During this time, the mold is not available for production. Moreover, fine engravings in the mold, e.g. an imitation of a wood structure or leather grain, become covered with an accumulation of residues of mold release agent over a period time. These residues, which adhere very firmly to the mold, are very difficult to remove, especially since the molds frequently have a highly structured surface. In addition, the molded resinous products become coated with a thin film of mold release agent to which the lacquer systems will not adhere. They must, therefore, be buffed or cleaned with solvents before they are lacquered in order to insure sufficiently firm adherence of the lacquer to the resin.

It has already been disclosed in U.S. Pat. No. 3,726,952 that the application of a mold release agent to the mold can be omitted if the foamable reaction mixture is mixed with certain addivitves which impart excellent mold release properties to the molded resin so that it can be released from metal molds with its surfaces intact. Salts, containing at least 25 carbon atoms, of aliphatic carboxylic acids and preferably primary amines or amines which contain amide or ester groups are disclosed as such additives.

In German Offenlegungsschrift No. 2,121,670 a process has been disclosed for the production of foams by foaming a reaction mixture of polyisocyanates, compounds which contain reactive hydrogen atoms, water and/or organic blowing agents and additives in a closed mold, in which process the additives used are e.g. a mixture of (a) salts containing at least 20 aliphatic carbon atoms of aliphatic carboxylic acids and amines which may contain amide and/or ester groups and (b) natural and/or synthetic oils, fats, or waxes.

Since these additives have an internal lubricating effect on the synthetic resin mixture, they also impart excellent flow properties to the resin in the mold and reduce the formation of bubbles on the surface of the resin. In addition, these internal mold release agents have an antistatic effect and excellent mold release properties even in metal molds which have a highly structured surface.

Although excellent mold release effects can be obtained by the known processes, the disclosed esters or mixed esters of higher fatty acids prepared from synthetic oils or waxes are so incompatible with the starting components of the foamable reaction mixture that the foamable reaction components and the internal mold release agent separate into two individual phases. Separation in the storage containers can be prevented in most instances by stirring, but this is undesirable because such containers frequently have no stirrers. Moreover, in some cases, separation into phases may even occur during transport of the mixture from where it is prepared to the place where it is to be molded.

It would, therefore, be desirable to provide a foamable mixture containing an internal release agent which can be mixed with at least one of the starting components of the foam to form a stable mixture which will not separate into two or more phases.

It is an object of this invention to provide an improved process for molding foamable reaction mixtures containing an organic polyisocyanate. Another object of this invention is to provide a process for molding foamable mixtures containing an organic polyisocyanate and an internal mold release agent which is devoid of the foregoing disadvantages. Still another object of this invention is to provide a foamable reaction mixture containing an organic polyisocyanate and an effective internal release agent which is miscible with the other components of the mixture and is substantially insensitive to moisture. A further object of the invention is to provide a foamable reaction mixture containing an organic polyisocyanate adapted for molding a series of products one after the other without interruption for the application of a mold release agent to the surface of the mold.

The foregoing objects and others are accomplished in accordance with this invention, generally speaking, by providing a process for molding a foamable reaction mixture containing an organic polyisocyanate and a reaction product of an organic monoisocyanate with an ester or mixed ester of a higher fatty acid which contains active hydrogen atoms as a mold release agent. It has now been found that reaction products of fatty acid esters and monoisocyanates which are soluble in organic polyisocyanates may be incorporated in foamable reaction mixtures as internal mold release agents. Surprisingly, such reaction products function as suitable mold release agents even though they probably do not contain any free isocyanate groups and probably also are not firmly built chemically into the structure of the resulting foam. Hence, the behavior of such reaction products in the foamable reaction mixture is not completely understood and is different from that of a fatty acid ester - polyisocyanate reaction product.

This provides a commercial advance in the art because it is now possible to provide mold release agents which are soluble in the isocyanate component used for production of the foam or in the polyol and, therefore, do not separate from them. Moreover, a foamable reaction mixture containing the reaction product of an organic monoisocyanate and a fatty acid ester is stable in storage because such reaction products, unlike those of organic polyisocyanates and fatty acid esters are insensitive to moisture.

This invention, therefore, relates to a process for the production of foam resins based on organic polyisocyanates in which a reaction product of a fatty acid ester and an organic monoisocyanate is included in the reaction mixture as an internal mold release agent which will not separate from the other components of a foamable reaction mixture containing an organic polyisocyanate and is insensitive to any moisture to which the foamable mixture might be exposed in storage.

A process in which the foams are produced by foaming a reaction mixture containing an organic polyisocyanate, an organic compound containing reactive hydrogen atoms and having a molecular weight of at least 62, preferably 62 to 10,000, water and/or organic blowing agents and optionally other additives together with the addition of reaction products of fatty acid esters of monoisocyanates is preferred.

The mold release action can be measured in terms of the force of kg wt/cm$^2$ which is required to open the mold for releasing the molded product or it may be assessed subjectively by opening a suitable mold by hand and removing a foamed panel (20 × 20 × 1 cm) from it. The mold release forces which are required for releasing foams which contain the internal mold release reaction product provided by the invention are significantly lower than those required for foams which are the same except that the reaction mixture was foamed without these additives.

In this specification, by foam resins based on polyisocyanates are meant both foams which can be obtained from organic polyisocyanates alone and those which are produced with the addition of compounds which contain at least two Zerewitinoff active hydrogen atoms, e.g. polycarbodiimide, polyisocyanurate, polyurea, polybiuret, polyamide, polyallophanate or polyurethane foams or mixed types or other foams based on organic polyisocyanates. The process described herein is particularly suitable for the production of foams which contain urethane groups.

Any suitable organic polyisocyanate may be used as a starting component of the foamable reaction mixture of the invention for the production of a foam such as aliphatic, cycloaliphatic, araliphatic, aromatic or heterocyclic polyisocyanates including those described e.g. by W. Siefgen in Justus Liebis Annalen der Chemie, 562, pages 75 to 136, for example, ethylene diisocyanate; tetramethylene-1,4-diisocyanate, hexamethylene-1,6-diisocyanate; dodecane-1,12-diisocyanate; cyclobutane-1,3-diisocyanate; cyclohexane-1,3-diisocyanate, cyclohexane-1,4-diisocyanate and any mixtures of these isomers; 1-isocyanato-3,3,5-trimethyl-5-isocyanatomethyl-cyclohexane (German Auslegeshrift No. 1,202,785); hexahydrotolylene-2,4-diisocyanate, hexahydrotolylene-2,6-diisocyanate and any mixtures of these isomers; hexahydrophenylene diisocyanate, hexahydro-1,3-1,4-phenylene diisocyanate; perhydro-2,4-diphenylmethane diisocyanate, perhydro-4,4'-diphenylmethane-diisocyanate; phenylene-1,3-diisocyanate, phenylene-1,4-diisocyanate; tolylene-2,4-diisocyanate, tolylene-2,6-diisocyanate and any mixtures of these isomers; diphenylmethane-2,4'-diisocyanate, diphenylmethane-4,4'-diisocyanate; naphthylene-1,5-diisocyanate; triphenylmethane-4,4',4''-triisocyanate; polyphenyl-polymethylene-polyisocyanates which can be obtained by aniline-formaldehyde condensation followed by phosgenation and which have been described e.g. in British Patent Specification Nos. 874,430 and 848,671; perchlorinated aryl polyisocyanates, e.g. those described in German Auslegeschrift No. 1,157,601; polyisocyanates which contain carbodiimide groups as described in German Patent Specification No. 1,092,007; the diisocyanates described in U.S. Pat. No. 3,492,330; polyisocyanates which contain allophanate groups as described e.g. in British Patent Specification No. 994,890; Belgian Patent Specification No. 761,626 and published Dutch Patent Application No. 7,102,524; polyisocyanates which contain isocyanurate groups as described e.g. in German Patent Specification Nos. 1,022,789; 1,222,067 and 1,027,394 and in German Offenlegungsschriften Nos. 1,929,034 and 2,004,048; polyisocyanates which contain urethane groups as described e.g. in Belgian Patent Specification No. 752,261 or in U.S. Pat. No. 3,394,164; polyisocyanates which contain acylated urea groups in accordance with German Patent Specification No. 1,230,778; polyisocyanates which contain biuret groups as described e.g. in German Patent Specification No. 1,101,394; in British Patent Specification No. 889,050 and in French Patent Specification No. 7,017,514; polyisocyanates which are prepared by telomerization reactions as described e.g. in Belgian Patent Specification No. 723,640; polyisocyanates which contain ester groups as described in e.g. in British Patent Specifications No. 965,474 and 1,072,956; in U.S. Pat. No. 3,567,763 and in German Patent Specification No. 1,231,688 and reaction products of the above mentioned isocyanates with acetals in accordance with German Patent Specification No. 1,072,385.

The distillation residues which still contain isocyanate groups from the commercial production of isocyanates may also be used, optionally in the form of solutions in one or more of the above mentioned polyisocyanates. Any mixtures of the above mentioned polyisocyanates may also be used.

It is generally preferred to use commercially readily available polyisocyanates such as tolylene-2,4-diisocyanate and tolylene-2,6-diisocyanate and any mixtures of these isomers ("TDI"), polyphenyl-polymethylene-polyisocyanates which are prepared by aniline-formaldehyde condensation followed by phosgenation ("crude MDI") and polyisocyanates which contain carbodiimide groups, urethane groups, allophanate, isocyanurate groups, urea groups or biuret groups ("modified polyisocyanates").

Any suitable organic compound which contains at least two hydrogen atoms determinable by the Zerewitinoff method and capable of reacting with isocyanates and preferably has a molecular weight of 62 to 10,000 may be used as the polyol starting component of the foamable reaction mixture for the production of foams according to the invention. These may be compounds which contain amino groups, thiol groups or carboxyl groups but are preferably polyhydroxyl compounds containing 2 to 8 hydroxyl groups, especially those with a molecular weight of 800 to 10,000, preferably 1,000 to 6,000 e.g. polyesters, polyethers, polythioethers, polyacetals, polycarbonates and polyester amides containing at least two generally two to eight but preferably 2 to 4 hydroxyl groups. These polyhydroxyl compounds are known per se for the production both of homogeneous and of cellular polyurethanes. The hydroxyl polyesters used as starting materials may be, for example, the reaction products of polyvalent alcohols, preferably divalent alcohols to which trivalent alcohols, may be added, with polybasic, preferably dibasic, carboxylic acids.

Instead of free polycarboxylic acids, the corresponding polycarboxylic acid anhydrides or corresponding polycarboxylic acid esters of lower alcohols or mixtures thereof may be used for producing the polyesters. The polycarboxylic acids may be aliphatic, cycloaliphatic, aromatic, and/or heterocyclic and may be substituted, e.g. with halogen atoms and/or unsaturated. The following are examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid which may be mixed with monomeric fatty acids, dimethylterephthalate, bis-glycol terephthalate and the like.

The following are examples of suitable polyhydric alcohols: ethylene glycol, propylene-1,2-glycol, propylene-1,3-glycol, butylene-1,4-glycol, butylene-2,3-glycol, hexane-1,6-diol, octane-1,8-diol, neopentylglycol, cyclohexane dimethanol (1,4-bis-hydroxymethylcyclohexane), 2-methyl-propane-1,3-diol, glycerol, trimethylolpropane, hexane-1,2,6-triol, butane-1,2,4-triol, trimethylolethane, pentaerythritol, quinitol, mannitol, sorbitol, methyl glycoside, diethylene glycol, triethyleneglycol, tetraethylene glycol, the polyethylene glycols, dipropylene glycol, polypropylene glycols, dibutylene glycol, polybutylene glycols and the like. The polyesters may also contain terminal carboxyl groups. Polyesters of lactones such as ε-caprolactone or hydroxycarboxylic acids such as ω-hydroxycaproic acid may be used. The low molecular weight polyhydric alcohols mentioned above may also be used as such.

The polyethers which may be used according to the invention, which contain at least two, generally two to eight and preferably two or three hydroxyl groups, are also known per se and are prepared e.g. by the polymerization of epoxides such as ethylene oxide, propylene oxide, butylene oxide, tetrahydrofuran, styrene oxide or epichlorohydrin, each with itself, e.g. in the presence of boron trifluoride, or by the addition of these epoxides, either as mixtures or succcessively, to starting components which contain reactive hydrogen atoms such as alcohols or amines, e.g. water, ethylene glycol, propylene-1,3-glycol, propylene-1,2-glycol, trimethylolpropane, 4,4'-dihydroxy-diphenylpropane, aniline, ammonia, ethanolamine or ethylene diamine and the like. The sucrose polyethers described e.g. in German Auslegeschriften Nos. 1,176,358 and 1,064,938 may also be used according to the invention. It is frequently preferred to use polyethers which contain predominantly primary hydroxyl groups (up to 90% by weight, based on all the hydroxyl groups present in the polyether). Polyethers which have been modified with vinyl polymers, e.g. the compounds obtained by polymerization of styrene or acrylonitrile in the presence of polyethers (U.S. Pat. Nos. 3,383,351; 3,304,273; 3,523,093 and 3,110,695 and German Patent Specification No. 1,152,536) and polybutadienes which contain hydroxyl groups are also suitable.

Any suitable polythioether may be used including the condensation products of thiodiglycol with itself and/or with other glycols, dicarboxylic acids, formaldehyde, aminocarboxylic acids, amino alcohols and the like. The products obtained are either polythio mixed ethers or polythioether esters or polythioether ester amides, depending on the cocomponent.

Any suitable polyacetal may be used e.g. the compounds obtained from glycols such as diethylene glycol, triethylene glycol, 4,4'-dioxethoxy-diphenyl-dimethylmethane, hexanediol, formaldehyde and the like. Polyacetals suitable for the process according to the invention may also be prepared by polymerizing cyclic acetals.

The hydroxypolycarbonates used may be those known per se e.g. those obtained by reacting diols such as propane-1,3-diol, butane-1,4-diol and/or hexane1,6-diol, diethylene glycol, triethylene glycol or tetraethylene glycol with diaryl carbonates such as diphenylcarbonate or phosgene.

The polyesteramides and polyamides which are suitable include e.g. the predominantly linear condensates which can be obtained from polyvalent saturated and unsaturated carboxylic acids or their anhydrides and polyvalent saturated and unsaturated amino alcohols, diamines, polyamines and their mixtures.

Polyhydroxyl compounds which already contain urethane or urea groups and modified or unmodified natural polyols such as caster oil, carbohydrates or starch may also be used as the polyol component of the foamable reaction mixture. Addition products of alkylene oxides with phenol formaldehyde resins or with urea formaldehyde resins may also be used according to the invention.

Representatives of the various organic compounds having reactive hydrogen atoms, which may be used according to the invention have been described e.g. in High Polymers, Volume XVI "Polyurethanes, Chemistry and Technology", published by Saunders-Frisch, Interscience Publishers, New York/London, Volume I, 1962, pages 32–42 and pages 44–54 and Volume II, 1964, pages 5–6 and 198–199, and in Kunststoff-Handbuch, Volume VII, Vieweg-Hochtlen, Carl-Hanser-Verlag, Munich, 1966, e.g. on pages 45 to 71.

According to the invention, water and/or readily volatile organic substances are included as blowing agents. Suitable organic blowing agents are e.g. acetone, ethyl acetate, halogenated alkanes such as methylene chloride, chloroform, ethylidene chloride, vinylidene chloride, monofluorotrichloromethane, chlorodifluoromethane, dichlorodifluoromethane or trichloro-trifluoroethane, butane, hexane, heptane and diethylether. A blowing effect can also be obtained by adding compounds which decompose at temperatures above room temperature to liberate gases such as nitrogen, e.g. azo compounds such as azoisobutyric acid nitrile. Other examples of blowing agents and details of the methods of using blowing agents may be found in Kunststoff-Handbuch, Volume VII published by Vieweg-Hochtlen, Carl-Hanser-Verl., Munich, 1966, e.g. on pages 108 and 109, 453 to 455 and 507 to 510.

Any of the suitable catalysts disclosed in the art may be used, e.g. tertiary amines such as triethylamine or tributylamine, N-methyl-morpholine, N-ethyl-morpholine, N-cocomorpholine, N,N,N',N'-tetramethylethylenediamine, 1,4-diaza-bicylco-(2,2,2)-octane, N-methyl-N'-dimethylaminoethyl-piperazine, N,N-dimethylbenzylamine, bis-(N,N-diethylamino-ethyl)-adipate, N,N-diethyl-benzylamine, pentamethyldiethylenetriamine, N,N-dimethyl-cyclohexylamine, N,N,N',N'-tetramethyl-1,3-butanediamine, N,N-dimethyl-β-phenylethyl-amine, 1,2-dimethylimidazole, 2-methylimidazole, tetramethylguanidine and the like.

The following are examples of suitable tertiary amine catalysts containing hydrogen atoms which are reactive with isocyanate groups: triethanolamine, triisopropanolamine, N-methyl-diethanolamine, N-ethyl-diethanolamine, N,N-dimethyl-ethanolamine and their reaction products with alkylene oxides such as propylene oxide and/or ethylene oxide.

The catalysts used may also be silaamines which contain carbon-silicon bonds as described e.g. in German Patent Specification No. 1,229,290, e.g. 2,2,4-trimethyl-2-silamorpholine or 1,3-diethylaminomethyl-tetramethyl-disiloxane.

Bases which contain nitrogen such as tetraalkylammonium hydroxides, alkali metal hydroxides such as sodium hydroxide, alkali metal phenolates such as sodium phenolate or alkali metal alcoholates such as sodium methylate may also be used as catalysts. Hexahydrotriazines are also suitable catalysts.

Organic metal compounds may also be used as catalysts according to the invention, especially organic tin compounds.

The organic tin compounds used are preferably tin (II) salts (stannous salts) of carboxylic acids such as tin (II) acetate, tin (II) octoate, tin (II) ethylhexoate and tin (II) laurate and the dialkyl tin salts of carboxylic acids, e.g. dibutyl tin diacetate, dibutyl tin dilaurate, dibutyl tin maleate, dioctyl tin diacetate and the like.

Other representatives of catalysts which may be used according to the invention and details of their activity have been described in Kunststoff-Handbuch, Volume VII, published by Vieweg and Hochtlen, Carl-Hanser-Verlag, Munich 1966, e.g. on pages 96 to 102.

Any catalytic amount of the catalyst may be used but they are generally used in a quantity of between 0.001 and 10% by weight based on the quantity of the organic compound having a molecular weight of at least 62 which contains at least two hydrogen atoms capable of reacting with isocyanates.

Surface active additives (emulsifiers and foam stabilizers) may also be included in the process according to the invention. Suitable emulsifiers are e.g. the sodium salts of ricinoleic sulphonates or of fatty acids or salts of fatty acids with amines such as oleic acid diethylamine or stearic acid diethanolamine. Alkali metal or ammonium salts of sulphonic acids, such as dodecylbenzene sulphonic acid or dinaphthylmethane disulphonic acid, or of fatty acids such as ricinoleic acid or of polymeric fatty acids may also be used as surface active additives.

The foam stabilizers used are mainly water-soluble polyether siloxanes. The structure of these compounds is generally such that a copolymer of ethylene oxide and propylene oxide is attached to a polydimethylsiloxane group. Foam stabilizers of this kind have already been described e.g. in U.S. Pat. No. 3,201,372, Column 3, line 60 to Column 4, line 3.

Reaction retarders may also be used according to the invention, e.g. substances which are acid in reaction such as hydrochloric acid, sulphuric acid, phosphoric acid or organic acid halides; cell regulators known per se such as paraffins or fatty alcohols or dimethylpolysiloxanes, pigments, dyes, flame retarding agents known per se e.g. tris-chloroethylphosphate or ammonium phosphate and polyphosphate, stabilizers which protect against ageing and weathering, plasticizers, fungistatic and bacteriostatic substances, and fillers such as barium sulphate, kieselguhr, carbon black or whiting may also be included.

Other examples of surface active additives, foam stabilizers, cell regulators, reaction retarders, stabilizers, flame retarding substances, plastizers, dyes, fillers and fungistatic and bacteriostatic substances which may be used in the process according to the invention and details of the methods of use and mode of action of these additives may be found in Kunststoff-Handbuch, Volume VII, published by Vieweg and Hochtlen, Carl-Hanser-Verlag, Munich 1966, e.g. on pages 103 to 113.

The foaming process is preferably carried out in molds into which the reaction mixture is introduced. The molds may be made of metal, e.g. aluminum, or of a plastics material such as an epoxy resin. The reaction mixture foams up inside the mold to form the molded product. The process of foaming in the mold may be carried out to produce a molded product which has a cellular structure on its surface but it may also be carried out to produce a molded product with a compact skin and a cellular core. According to the invention, it may be carried out by introducing just sufficient reaction mixture into the mold to fill the mold when it has foamed up. Alternatively, a larger quantity of reaction mixture than is necessary for filling the mold with foam may be introduced. This method is known as "overcharging". It has been described e.g. in U.S. Pat. Nos. 3,178,490 and 3,182,104.

In the process of foaming in the mold, the mold parting agents known per se may in addition be used.

Cold setting foams may also be produced by the process according to the invention (see British Patent Specification No. 1,162,517 and German Offenlegungsschrift No. 2,153,086).

Reaction products of fatty acid esters and monoisocyanates are included in the foamable reaction mixture according to the invention as internal mold release agents.

Any suitable monoisocyanate may be used such as, for example, aliphatic, araliphatic, aromatic or heterocyclic isocyanates or acylisocyanates. Organic monoisocyanates which contain more than 5 carbon atoms in the molecule are preferred although other monoisocyanates, e.g. methyl isocyanate, chlorocarbonyl isocyanate or methoxymethyl isocyanate may be used for the modification.

The following are examples of suitable monoisocyanates: benzyl isocyanate, benzoyl isocyanate, tosyl isocyanate, phenyl isocyanate, tolyl isocyanate, dimethylphenyl isocyanate, phenoxyphenylisocyanate, tetradecylisocyanate, hexadecylisocyanate, cyclohexylisocyanate, isopentyl isocyanate, isononyl isocyanate, monoisocyanates derived from amines which can be obtained synthetically from resinic acids or fatty acids, for example, dihydroabietyl isocyanate, oleyl or stearylisocyanate. Monoisocyanates which can be obtained e.g. by reacting compounds which contain Zerewitinoff active hydrogen atoms, preferably one such hydrogen atom, with polyisocyanates, in particular diisocyanates, to produce an addition compound which still contains only one isocyanate group in the molecule are also suitable. The reaction carried out for producing such monoisocyanates is thus preferably carried out with a molar ratio of 1:1.

Complex monoisocyanates which can be obtained from polyesters or polyethers which substantially contain only one hydroxyl, amino or carboxyl group per molecule by reacting these polyesters or polyethers with diisocyanates, e.g. diisocyanates which can be obtained by the phosgenation of aniline-formaldehyde condensates, are of special interest. In this connection there may be mentioned as examples the equimolar reaction products obtained when the products of polyaddition of ehtylene oxide and/or propylene oxide with monoalcohols are reacted with diphenylmethane diisocyanate, tolylene diisocyanate, 1-isocyanato-3,5,5-trimethyl-5-isocyanatomethylcyclohexane, hexamethylene diisocyanate, undecamethylene diisocyanate or naphthylene-1,5-diisocyanate or equimolar reaction products of these isocyanates with benzylamine, cyclohexylamine, oleylamine or monoaminopolyethers.

In principle, such monoisocyanates can also be obtained from molcules which contain n isocyanate groups by reacting n-1 of these isocyanate groups with suitable acceptors, e.g. hydroxyl or amino groups.

For the purpose of this invention, however, it is preferred to use reaction products of fatty acid esters and monoisocyanates which contain 5 to 50 carbon atoms, in particular 5 to 30 carbon atoms, although in principle complex monoisocyanates with a higher number of carbon atoms may also be used.

Any suitable fatty acid ester may be used. Preferred fatty acid esters which incorporate in their molecule at least one aliphatic fatty acid which contains more than 8 carbon atoms and which have an acid number of from 0 to 100, preferably 0 to 40, and a hydroxyl number of 0 to 150, preferably 0 to 75, at least one of these two numbers having a value greater than 0 are used.

The fatty acid esters used may also have the character of polyesters or mixed esters which may be built up both from monofunctional and polyfunctional carboxylic acids and/or alcohols. When preparing the fatty acid esters, several different types of fatty acids or carboxylic acids and/or alcohols may be used together so that complicated fatty acid esters with an average molecular weight of 500 to 5000, preferably 800 to 3000, are obtained by mixed condensation.

Moreover, fatty acid mixed esters which contain basic or amide groups may be obtained by including amines or amino alcohols in the preparation of the esters. These mixed esters may be used in the process according to the invention. Such mixed esters may be obtained, for example, by using ammonia, monoalkylamines or dialkylamines or their alkoxylation products, e.g. with ethylene oxide, propylene oxide or higher epoxides or by adding acid amides which contain carboxyl groups or alcohol groups, which acid amides may be obtained e.g. by the amidation of carboxylic acids with monoalkanolamines or dialkanolamines such as ethanolamine or diethanolamine, propanolamine, dipropanolamine or the like.

The fatty acid esters used for the reaction with polyisocyanates are preferably those which can be obtained by esterifying carboxylic acids with alcohols or those which can be obtained from natural substrates. The following are examples of suitable carboxylic acids and alcohols: butanol, hexanol, octanol isomers, dodecanol, oleyl alcohol, other fatty alcohols, natural or synthetic steroid alcohols, ricinoleic acid, ethylene glycol, propylene glycol, butanediols, hexanediols, glycerol, trimethylolpropane, pentaerythritol, sorbitol, hexitol, various sugars or addition products of alkylene oxide, e.g. the product of addition of ehtylene oxide or propylene oxide to these alcohols and the like. Glycerol, trimethylolpropane, pentaerythritol and sorbitol are preferred.

The carboxylic acids may be saturated or unsaturated, preferably aliphatic, such as octane carboxylic acids, dodecanoic acids, natural fatty acids such as ricinoleic acid, oleic acid, elaidic acid, stearic acid, palmitic acid, linoleic acid, linolenic acid, abietic acid, train oil fatty acid, coconut fatty acids, tallow fatty acids or fatty acids obtained by paraffin oxidation, tall oil fatty acids, succinic acid, maleic acid, citric acid, azelaic acid, adipic acid or higher dicarboxylic and polycarboxylic acids, oligomerization products of unsaturated carboxylic acids, addition products of maleic acid with natural and synthetic oils and the like. Oleic acid, tall oil fatty acids, linoleic acid, ricinoleic acid and adipic acid are preferred. The preparation of the fatty acid esters is most suitably carried out by cocondensation of the alcohols and acids used at temperatures above 100°C, preferably 120°to 180°C, optionally under vacuum, water being liberated until the desired hydroxyl and acid numbers and average molecular weights are obtained. The process of esterification may, of course, be catalyzed with acid or basic catalysts or accompanied by azeotropic dehydration. The reaction products obtained and used for the process according to the invention preferably contain hydroxyl groups and/or carboxylic acid groups.

Fatty acids which have been found to be particularly suitable for the process according to the invention are cocodensates of oleic acid with dicarboxylic acid such as adipic acid and a polyfunctional alcohol such as pentaerythritol, which have molecular weights of between 900 and 2500, hydroxyl numbers of between 30 and 70 and acid numbers of between 3 and 30.

Ricinoleic acid polyesters which have molecular weights between 800 and 2500 are also of special interest.

There is not always a direct stoichiometric relationship between the hydroxyl and acid numbers found and the molar ratio in which the components are used in the reaction, possibly because side reactions of an unknown nature take place in parallel with the process of esterification.

In principle, any known monoisocyanates are suitable for the reaction with fatty acid esters, e.g. the monoisocyanates mentioned above.

The reaction of the fatty acid ester or mixtures of fatty acid esters with the monoisocyanates is carried out by mixing the fatty acid ester with the isocyanate and reacting them at a temperature of between 30° and 200°C, preferably between 45° and 110°C, optionally with stirring. Lower reaction temperatures may in principle also be employed but in that case the reaction time required for obtaining reaction products suitable for the process according to the invention is uneconomically long. Although the reaction may be accelerated with catalysts, this should be avoided in order to avoid altering unfavorably the reactivity of the formulation during the subsequent production of the foam.

The reaction between the fatty acid ester and the monoisocyanate is generally carried out with a mixture of 0.5 to 70% by weight (preferably 1 to 55% by weight) of fatty acid ester and 99.5 to 30% by weight (preferably 99 to 45% by weight) of monoisocyanate at a temperature of between 30° and 200°C. The reaction products are, of course also effective for the purpose of this invention if the reaction between isocyanate and fatty acid ester is carried out with stoichiometric proportions by weight. Any excess of isocyanate present in the reaction products may be removed by distillation or it may be left in the reaction mixtures if these are to be mixed with the polyiosocyanate, for example, or conveyed directly to the foaming process.

The reaction products used according to the invention may be added as such to the starting components used for producing foam, e.g. to the polyisocyanate or also to the polyol. It is often advantageous to mix the reaction product with the polyisocyanate which is used as starting material for producing the foams. In that case, the quantity of fatty acid ester reaction product used is generally between 0.5 and 35% by weight, preferably between 2 and 25% by weight, based on the quantity of polyisocyanate. The product obtained after distribution of the reaction product in the excess polyisocyanate can be used directly for foaming ("modified" polyisocyanates) and gives rise to foams which have excellent mold release properties.

If desired, the reaction products of monoisocyanates and fatty acid esters may, of course, be prepared first, as already described above, and later diluted with polyisocyanate, optionally with an isocyanate mixture, or alternatively the reaction product used according to the invention may be added seeparately in the production of the foam.

The foam formulations may, of course, contain other mold release agents or systems in addition, for example those described in German Offenlegungsschrift No. 1,953,637 or in Belgian Patent Specification No. 782,942, e.g. the oleic acid or tall oil fatty acid salt of amide group-containing amine which is obtained by reacting N-dimethylaminopropylamine with oleic acid or tall oil fatty acid.

In accordance with the invention, the reactants are reacted together by the known one-stage prepolymer or semi-prepolymer process, often using mechanical devices, e.g. those described in U.S. Pat. No. 2,764,565. Details of equipment which may be used for the process according to the invention are given in Kunststoff-Handbuch, Volume VI, published by Vieweg and Hochtlen, Carl-Hanser-Verlag, Munich 1966, e.g. on pages 121 to 205.

The process may be used to produce ridid products suitable for the manufacture of furniture parts, body parts of vehicles, technical equipment and building elements as well as semi-rigid or flexible products for producing safety padding in motor vehicles or elastic shoesoles.

The process according to the invention will now be described with the aid of the following examples. The parts given are parts by weight unless otherwise indicated. The polysiloxane stabilizer used in the working examples has the average formula:

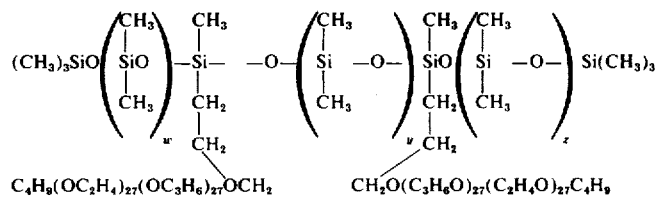

where the sum of $w$, $y$ and $z$ is about 16.

EXAMPLES

The preparation of several fatty acid esters will first be described by way of example. The method of preparation described is applicable in principle to practically all types of fatty acid esters.

FATTY ACID ESTER A 544 parts of pentaerythritol, 3390 parts of oleic acid and 292 parts of adipic acid are stirred under nitrogen at 140°C for 8 hours. Stirring is then continued for 24 hours under a vacuum at 140°c and then for 5 hours under a water jet vacuum at 160°C. The end product is a clear, viscous liquid which has an average molecular weight of 1100 (cryoscopic) hydroxyl number of 19.5 and acid number of 25.0.

FATTY ACID ESTER B 680 parts of pentaerythritol, 3390 parts of oleic acid and 292 parts of adipic acid are heated to 150°C in a water jet vacuum over a period of 20 hours and then left at 150°C under vacuum for 3 hours. The condensation product obtained has a hydroxyl number of 50 and an acid number of 5.0. The average molecular weight is found to be 905.

FATTY ACID ESTER D 300 parts of ricinoleic acid are heated to 140°C in a water jet vacuum and stirred at this temperature for 35 hours. A clear polyester with an average molecular weight of 1800, hydroxyl number of 30.3 and acid number 34.6 is then obtained.

FATTY ACID ESTER E

The method is the same as that used for preparing the fatty acid ester D except that the reaction mixture is kept for only 15 hours at 140°C in a water jet vacuum. The resulting ester has an average molecular weight of 1070.

Fatty Acid Ester F

Ester of 4 mols of train oil fatty acid (average molecular weight approximately 285) and 1 mol of sorbitol, acid number approximately 3 and hydroxyl number approximately 130.

Fatty Acid Ester G

Natural wool fat, hydroxyl number approximately 53, acid number approximately 0.7.

When fatty acid esters A to G are mixed with one of the isocyanates mentioned in the following examples so that the mixture contains approximately 5 to 10% by weight of the fatty acid ester, then the mixture separates into two phases over a period of a few hours or days at room temperature. This effect is undesirable and, as the following examples which serve to explain the process but not to restrict it to the mixtures described show, the effect can be prevented in the process according to the invention by a temperature treatment which gives rise to the reaction products used according to the invention.

The mixtures of isocyanate and reaction product used in the following examples therefore no longer show this separation effect.

EXAMPLE 1

A. Preparation of the reaction product used according to the invention.

96 parts by weight of a monoisocyanate obtained by reacting 1 mol of 4,4'-diisocyanate-diphenylmethane with 1 mol of a polyether with hydroxyl number 74 (n-butanediol + 48% ethylene oxide and 52% propylene oxide) (isocyanate content of monoisocyanate = 40%) are mixed with 100 parts by weight of fatty acid ester B.

The components are reacted together at 60°C. The reaction mixture is kept at 60°C for 4 hours with stirring. After termination of the reaction, the isocyanate content of the polyisocyanate is 0%.

B. Process according to the invention

The following starting components are used: 100 parts by weight of a polyol mixture with hydroxyl number 517 and a viscosity of 1560 cP at 25°C which comprises, firstly, 60 parts by weight of a polyether with hydroxyl number 830 which has been obtained by the addition of propylene oxide to trimethylolpropane and, secondly, 40 parts by weight of a polyether with hydroxyl number 42 which has been obtained by the addition of propylene oxide and ethylene oxide (as mixture) to a mixture of trimethylolpropane and propylene glycol (molar ratio 3:1); 1 part by weight of a polysiloxane-polyalkylene oxide block copolymer as foam stabilizer; 0.7 parts by weight of trimethylguanidine as catalyst; 12 parts by weight of monofluorotrichloromethane; 135 parts by weight of a polyisocyanate which has been obtained by aniline-formaldehyde condensation followed by phosgenation and which has a viscosity of 110 cP at 25°C and an isocyanate content of 31.5%; and 6 parts by weight of additive 1A according to the invention. The polyol mixture and blowing agent are introduced into a two-component feeding and mixing apparatus where they are vigorously mixed with the polyisocyanate to produce the foaming reaction mixture and then immediately introduced into a metal mold heated to 60°C. The cavity of the mold is lined with nickel plate and the force is made of rolled aluminum. The molded product, a rectangular box with a wall thickness of 15 mm, has the following dimensions: Base 360 × 250 mm, height 40 mm. The mold is clamped to a hydraulic closing device which makes it possible to measure accurately the opening forces. The force required to tear open the mold is transmitted to a pick-up, converted into an electric signal, amplified in a carrier frequency measuring amplifier and recorded with a compensation line writer. The data recorded are used firstly to calculate the specific opening forces required to open the tool and secondly to determine the forces required to remove the produce from the cavity of the mold by means of ejectors. The product is removed from the mold 7 minutes after the introduction of the reaction mixture into the mold.

The mold can be opened with a specific opening force of 0.06 kg/cm². The ejectors require a specific opening force of 0.20 kg/cm² to remove the product from the mold. Analogous results are obtained when fatty acid ester A is used instead of fatty acid ester B.

EXAMPLE 2

A. Preparation of the reaction product used according to the invention.

174 parts by weight (1 mol) of an isomeric mixture of 80% by weight of tolylene-2,4-diisocyanate and 20% by weight of tolylene-2,6-diisocyanate (viscosity at 25°C = 3 cP, NCO content = 48.3% by weight) are reacted with 14 g (1 mol) of tetradecanol to produce a monoisocyanate (NCO content = 10.8%).

36 parts by weight of this monoisocyanate are reacted with 100 parts by weight of fatty acid ester B at 60°C for 8 hours with stirring. The isocyanate content of the additive according to the invention is 0%.

B. Process according to the invention:

100 parts by weight of the polyol mixture described in Example 1(B), 1 part by weight of foam stabilizer according to Example 1(B), 12 parts by weight of monofluorotrichloromethane, 0.7 parts by weight of tetramethylguanidine, 3 parts by weight of amidamine-oleic acid salt (prepared from 1 mol of 3-dimethylaminopropylamine-1 and 2 mols of oleic acid), 132 parts by weight of the polyisocyanate according to Example 1(B) and 6 parts by weight of the additive 2A according to the invention are together foamed up as described in Example 1(B) to produce a molded foam product. When the mixture has been in the mold for 7 minutes, the forces required for opening the mold are less than 0.05 kg/cm². The ejectors remove the products from the mold with a specific force of 0.10 kg/cm². Similar results are obtained with fatty acid ester A.

EXAMPLE 3

A. Preparation of the reaction product used in accordance with the invention.

174 parts by weight (1 mol) of an isomeric mixture of 80% by weight of tolylene-2,4-diisocyanate and 20% by weight of tolylene-2,6-diisocyanate (viscosity at 25°C = 3cP, NCO content = 48.3% by weight) are reacted with 256 g (1 mol) of a fatty alcohol mixture (C 14 – C 20 fraction) to product a monoisocyanate. The isocyanate content is 9.7%.

39 parts by weight of this monoisocyanate are reacted with 100 parts by weight of fatty acid ester B for 4 hours at 70° with stirring. After termination of the reaction, the isocyanate content is 0%.

B. Process according to the invention:

100 parts by weight of the polyol mixture described in Example 1(B), 1 part by weight of the foam stabilizer according to Example 1(B), 12 parts by weight of monofluorotrichloromethane, 0.7 part by weight of tetramethyl guanidine, 135 parts by weight of the polyisocyanate described in Example 1(B) and 6 parts by weight of additive 3A according to the invention are reacted to produce a molded polyurethane product as described in detail in Example 1. The molded product was removed from the mold after 7 minutes. A specific opening force of 0.02 kg/cm² is required for opening the mold. The mechanical ejectors remove the product from the mold with a specific force of 0.20 kg/cm².

EXAMPLE 4

A. Preparation of the reaction product used according to the invention:

107 parts by weight of phenylisocyanate are reacted with 100 parts by weight of fatty acid ester B at 80°C for 3 hours. The isocyanate content of the modified isocyanate is 0%. 5 kg of this additive according to the invention are mixed in the cold with 95 parts by weight of a polyisocyanate which has been obtained by phosgenating anilineformaldehyde condensates and then reacting the phosgenation product with a diol which has a hydroxyl number of 580, the said polyisocyanate having a viscosity of 430 cP at 25°C and an isocyanate content 28% by weight. The viscosity of this modified polyisocyanate at 25°C = 148 cP. The isocyanate content is 27.4%.

B. Processs according to the invention:

The following starting components are used: 100 parts by weight of polyol mixture which has a hydroxyl number of 510 and a viscosity of 1230 cP at 25°C, consisting, firstly, of 20 parts by weight of a polyether with a hydroxyl number 540 which has been obtained by the addition of ethylene oxide to trimethylolpropane and, secondly, of 20 parts by weight of a polyester with hydroxyl number 380 which has been obtained by reacting 1 mol of adipic acid, 2.6 mols of phthalic acid anhydride and 1.3 mols of oleic acid with 6.9 mols of trimethylolpropane; 1 part by weight of a polysiloxanepolyalkylene oxide block copolymer as foam stabilizer; 0.7 parts by weight of tetramethylguanidine as catalyst; 5 parts be weight of monofluorotrichlormethane; 154 parts by weight of the polyisocyanate described in Example 4A. The crude mixture is foamed up to produce a molded product as described in Example 1B. After the reaction mixture has been in the mold for 7 minutes, the forces required for opening the mold amount to 0.1 kg/cm². The ejectors press the molded product out of the mold with a specific force of 0.3 kg/cm². Similar results are obtained with fatty acid ester A.

Although the invention has been described in detail for the purposes of illustration, it is to be understood that such detail is solely for that purpose and that variations can be made by those skilled in the art without departing from the spirit and scope of the invention except as it may be limited by the claims.

What is claimed is:

1. In a process for molding foam products wherein a foamable reaction mixture containing an organic polyisocyanate is reacted in a closed mold, said foamable reaction mixture being adapted to expand and fill the mold while closed, the improvement which comprises including in the foamable reaction mixture as a mold release agent a preformed reaction product of an active hydrogen containing fatty acid ester and an organic monoisocyanate, said reaction product being soluble in said organic polyisocyanate.

2. The process of claim 1 wherein the foamable reaction mixture contains a blowing agent, an organic compound having reactive hydrogen atoms and a molecular weight of 62 to about 10,000 and the said reaction product contains 5 to 50 carbon atoms.

3. The process of claim 2 wherein the said fatty acid ester is an ester of an aliphatic fatty acid having more than 8 carbon atoms, said ester having an acid number of 0 to 100 and a hydroxyl number of 0 to 150 with at least one of the said numbers being greater than 0 and an average molecular weight of between 500 to 5000.

4. The process of claim 2 wherein the fatty acid ester is an ester of (a) oleic acid, tall oil fatty acid, or a co-condensate of one of said acids and a dicarboxylic acid, and (b) a polyhydric alcohol.

5. The process of claim 2 wherein the fatty acid ester is an ester of oleic acid, adipic acid and pentaerythritol having an acid number of about 3 to about 30, a hyroxyl number of about 30 to about 70 and an average molecular weight of about 900 to about 2500.

6. The process of claim 1 wherein the fatty acid ester is a ricinoleic acid polyester having a molecular weight of between 800 and 2500.

7. The process of claim 1 wherein the said reaction product has been prepared by reacting a mixture of 1 to 55% by weight of fatty acid ester with 99 to 45% by weight of organic monoisocyanate at a temperature between 30° and 200°C.

8. The process of claim 1 wherein the said reaction product is prepared from a fatty acid ester and a monoisocyanate prepared by reacting a diisocyanate with one-half of its stoichiometric equivalent of an organic monohydroxyl compound.

9. The process of claim 1 wherein the foamable reaction mixture contains a mixture of mold release agents including the said reaction product.

10. The process of claim 9 wherein the mixture of mold release agents contains an oleic acid or tall oil fatty acid salt of the amide-containing amine which is the reaction product of N-dimethylaminopropylamine and oleic acid or tall oil fatty acid.

11. The process of improving the mold release properties of a molded product obtained by reacting and shaping a foamable reaction mixture containing an organic polyisocyanate in a closed mold which comprises including as a mold release agent an effective amount of the preformed reaction product of an active hydrogen containing fatty acid ester and an excess of an organic monoisocyanate in the foamable reaction mixture, said reaction product being soluble in the organic polyisocyanate.

12. The process of claim 1 wherein the monoisocyanate is benzyl isocyanate, phenyl isocyanate, tolyl isocyanate, cyclohexyl isocyanate or stearyl isocyanate.

13. The process of claim 1 wherein said reaction product is present in an amount from 0.5 to 35% by weight, based on the amount of organic polyisocyanate present.

14. The process of claim 11, wherein said reaction product is present in an amount from 0.5 to 35% by weight, based on the amount of organic polyisocyanate present.

* * * * *